April 22, 1969    A. E. LYNES ET AL    3,439,767
MOTOR VEHICLE SUSPENSION AND DRIVE ARRANGEMENT
Filed Oct. 27, 1967
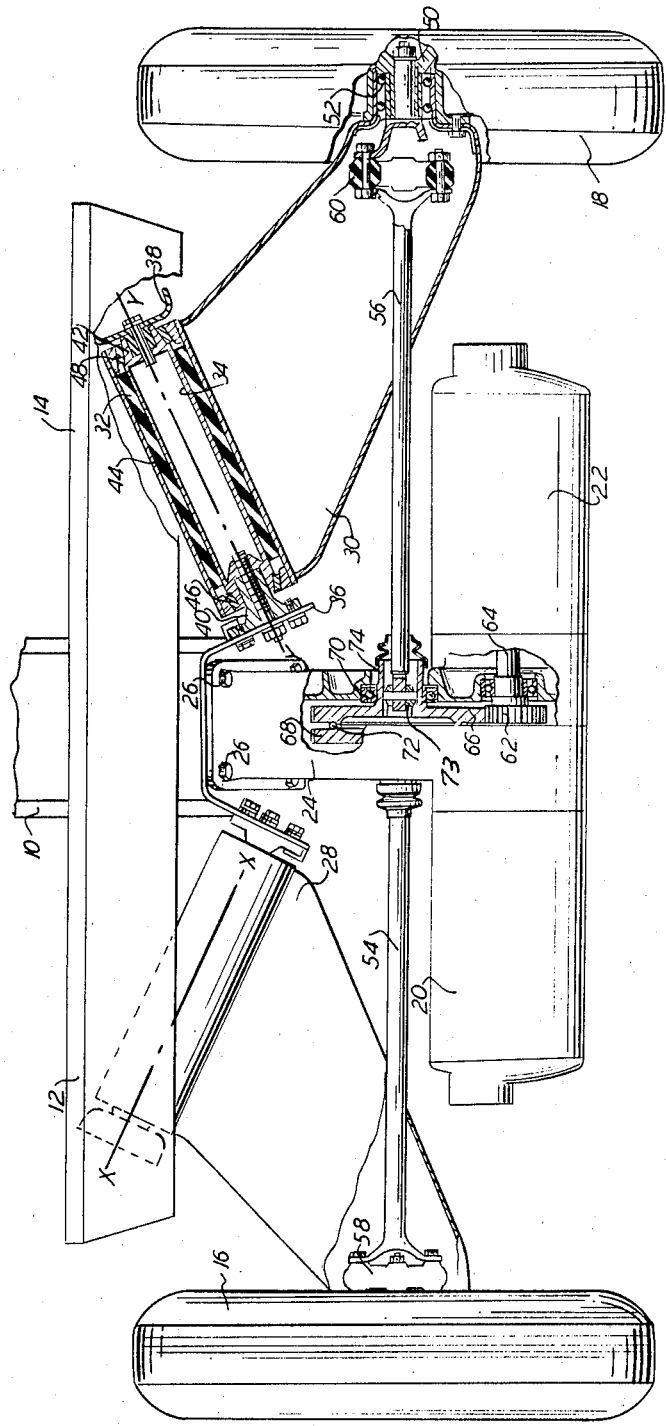
ARTHUR E. LYNES
LAURIE MARTLAND
INVENTORS
BY John R. Faulkner
Clifford L. Sadler
ATTORNEYS United States Patent Office 3,439,767
Patented Apr. 22, 1969

3,439,767
MOTOR VEHICLE SUSPENSION AND
DRIVE ARRANGEMENT
Arthur Edward Lynes, Thorpe Bay, and Laurie Martland, Basildon, England, assignors to Ford Motor Company, Dearborn, Mich., a corporation of Delaware
Filed Oct. 27, 1967, Ser. No. 678,602
Claims priority, application Great Britain, Apr. 12, 1967, 16,780/67
Int. Cl. B60k 17/00, 23/00, 1/00
U.S. Cl. 180—73                     6 Claims

ABSTRACT OF THE DISCLOSURE

A motor vehicle wheel suspension and final drive arrangement having independently sprung rear wheels and separate motors for driving each wheel. The motors are supported on a rigid housing that also contains gear sets for driving the wheels.

Background of the invention

The present invention relates to motor vehicles and, in its preferred embodiment, to the suspension and final drive arrangement for a motor vehicle that is driven by electric motors.

In vehicles employing electric motive power it is essential that the chassis structure be of a light-weight construction. By using electric motors in accordance with this invention, it is possible to have a unique final drive arrangement that meets the objective of minimum weight and is still relatively simple and economical to manufacture.

The present invention is particularly adaptable for use in a vehicle of the type shown and described in co-assigned United States application Serial Number 699,701, entitled Electric Propulsion Motor Vehicle, and filed Jan. 22, 1968, by Leslie Hall and Arthur E. Lynes. That application is based upon British patent applications 16,781, 16,782, 16,784 and 16,786 all of which were filed April 12, 1967.

Brief summary of the disclosure

According to the presently preferred embodiment of this invention, a motor vehicle comprises two rear wheels that are each driven by a separate motor by means of a half shaft. Each motor drives its associated half shaft through a pinion fixed to the inner end of the shaft. A thrust bearing is located between the left and right pinions to take the inward axial thrusts of the two half shafts. The two motors combine with the housing for the final drive gear assembly to form a rigid unit. The axes of the motors and of the half shafts both extend in a generally transverse direction.

Brief description of the drawing

How the invention may be carried out will now be described with reference to the accompanying drawing, the single figure of which is a plan view of one embodiment of the invention.

Detailed description of the invention

Referring now to the drawing, where the presently preferred embodiment of this invention is illustrated, a motor vehicle has a chassis that comprises a backbone 10 with outriggers 12 and 14 on which the rear suspension is mounted.

The motor vehicle has two rear wheels 16 and 18 which are driven independently by two electric motors 20 and 22, respectively. The electric motors 20, 22 and the housing 24 for a final drive assembly are secured, as a unit, by four bolts 26 to the rear end of the backbone 10.

The construction of the right-hand suspension and final drive is shown in greater detail than the left and will be described below. The left-hand construction is similar.

The rear wheels 16 and 18 are rotatably mounted at the rear ends of trailing suspension arms 28 and 30 which, in turn, are pivotally connected to the chassis to pivot about axes x—x and y—y. Each pivot incorporates a cylindrical rubber torsion spring 32 which is coaxial with the respective pivot axes and which forms the springing medium of the suspension.

The rubber spring 32 is supported on a tube 34 that is connected to chassis mounted brackets 36 and 38 by end fittings 40 and 42. The spring 32 is secured inside a tube 44 welded to the suspension arm 30. The tube 44 is rotatably mounted on the fittings 40 and 42 by bushings 46 and 48. This structure permits the arm 30 to pivot about the axis y—y.

At the rear or outer end of the suspension arm 30, a wheel hub 50 is rotatably supported by a span of ball bearings 52. The left and right rear wheels 16 and 18 are driven by left and right half shafts 54 and 56 through universal joints 58 and 60. The universal joint 60 is connected to the wheel hub 50 in the manner illustrated.

The half shafts 54 and 56 are driven by a final drive arrangement which will now be described. Each electric motor 20 and 22 has a first output pinion 62 on the end of its output shaft 64. The output pinion 62 for the right-hand motor 22 meshes with a second pinion 66 carried by the end of the right half shafts 56. Similarly, a pinion 68 is provided on the inner end of half shafts 54.

Each of the pinions 66 and 68 is located against axial outward movement by a bearing such as right-hand bearing 70. Axial movement in an inward direction is prevented by a common bearing 72 located between the two pinions 66 and 68 which takes the inward axial thrusts of the two half shafts 54 and 56.

The inner ends of the half shafts 54, 56 carry universal joint members 73 which are splined in tubular sockets 74 that are formed as extensions of the pinions 66 and 68. The universal joint members 73 allow a limited amount of angular pivoting of the half shafts 54 and 56 with respect to the sockets 74 as well as allowing the half shafts 54 and 56 to slide axially with respect to the sockets 74.

The electric motors 22 and 24 are mounted back-to-back and are located behind the half shafts 54 and 56, but more or less between the trailing arms 28 and 30 so that the overall length of the rear suspension and final drive is relatively short.

The foregoing description presents the presently preferred embodiment of this invention. Modifications and alterations may occur to those skilled in the art that will come within the scope and spirit of the following claims.

We claim:
1. A running gear for a motor vehicle comprising a vehicle frame, a pair of suspension arms pivotally connected to said frame, a road wheel rotatably mounted at the outer end of each of said arms, power means having a pair of output shafts, a pair of half shafts, means drivingly connecting said half shafts to said wheels, a pair of rotatably mounted gears connected to said frame, means drivingly connecting said half shafts to said gears, thrust bearing means interposed between said gears and constructed to prevent one of said gears from moving toward the other of said gears, said output shafts being connected to said gears.

2. A running gear for a motor vehicle according to claim 1 and including:

said power means comprising a pair of side-by-side electric motors mounted on said frame, said output shafts being coaxially arranged and comprising the output shafts of said motors.

3. A running gear for a motor vehicle according to claim 1 and including:
said suspension arms extending in an outwardly and rearwardly direction, said power means comprising a pair of motors mounted on said frame, said motors being situated generally between said wheels and spaced from the axis of rotation of said wheels.

4. A running gear for a motor vehicle according to claim 1 and including:
said suspension arms extending in an outwardly and rearwardly direction, said power means comprising a pair of side-by-side electric motors mounted on said frame, said output shafts being coaxially arranged and comprising the output shafts of said motors, said motors being situated generally between said wheels and spaced rearwardly from the axis of rotation of said wheels.

5. A running gear for a motor vehicle according to claim 1 and including:
left and right bearing means supporting said gears on said frame and constructed to prevent said gears from moving outwardly toward said wheels.

6. A running gear for a motor vehicle according to claim 1 and including:
said suspension arms extending in an outwardly and rearwardly direction, said power means comprising a pair of side-by-side electric motors mounted on said frame, said output shafts being coaxially arranged and comprising the output shafts of said motors, said motors being situated generally between said wheels and spaced rearwardly from the axis of rotation of said wheels, said means connecting said half shafts to said wheels comprising a pair of outer universal joints, said means connecting said half shafts to said gears comprising a pair of axially extendable inner universal joints, left and right bearing means supporting said gears on said frame and constructed to prevent said gears from moving outwardly toward said wheels.

References Cited
UNITED STATES PATENTS
3,002,580  10/1961  Mueller et al. _____ 180—73
FOREIGN PATENTS
1,000,146  10/1951  France.

A. HARRY LEVY, *Primary Examiner.*

U.S. Cl. X.R.
180—60, 65